(12) United States Patent
VanBochove et al.

(10) Patent No.: US 9,931,973 B2
(45) Date of Patent: Apr. 3, 2018

(54) HAY BALE TRANSPORT DEVICE

(71) Applicants: Brad VanBochove, Inwood, IA (US);
Henry VanBochove, Inwood, IA (US);
Justin VanBochove, Inwood, IA (US)

(72) Inventors: Brad VanBochove, Inwood, IA (US);
Henry VanBochove, Inwood, IA (US);
Justin VanBochove, Inwood, IA (US)

( * ) Notice: Subject to any disclaimer, the term of this patent is extended or adjusted under 35 U.S.C. 154(b) by 16 days.

(21) Appl. No.: 15/203,961

(22) Filed: Jul. 26, 2016

(65) Prior Publication Data

US 2018/0029521 A1 Feb. 1, 2018

(51) Int. Cl.
*B60P 7/15* (2006.01)
*B60P 3/00* (2006.01)

(52) U.S. Cl.
CPC .. *B60P 7/15* (2013.01); *B60P 3/00* (2013.01)

(58) Field of Classification Search
CPC ................ B60P 7/15; B60P 7/135; B60P 3/00
See application file for complete search history.

(56) References Cited

U.S. PATENT DOCUMENTS

| 1,677,733 | A | | 7/1928 | Schiftner | |
|---|---|---|---|---|---|
| 3,240,008 | A | | 3/1966 | McMullen | |
| 3,941,265 | A | * | 3/1976 | Nunnally, Jr. | ....... A01D 87/122 172/19 |
| 3,972,308 | A | * | 8/1976 | Ray | ..................... A01K 5/0107 119/60 |
| 4,431,357 | A | | 2/1984 | Butler | |
| 4,691,957 | A | | 9/1987 | Ellingson | |
| 5,340,259 | A | | 8/1994 | Flaskey | |
| 6,079,926 | A | * | 6/2000 | Cox | ........................ A01D 90/08 414/111 |
| 6,997,663 | B2 | | 2/2006 | Siebebga | |
| 7,004,706 | B1 | * | 2/2006 | Wilson | ................. A01D 90/083 414/111 |
| 7,189,042 | B1 | * | 3/2007 | Schmit | .................. B60P 7/0823 296/100.15 |
| 7,241,098 | B1 | * | 7/2007 | Wilson | ................. A01D 90/083 414/111 |
| 7,465,140 | B2 | * | 12/2008 | Pronovost | .............. A01D 90/08 414/111 |
| 8,523,502 | B2 | * | 9/2013 | Krassort | .............. A01D 90/083 410/117 |
| 9,120,414 | B1 | * | 9/2015 | Matlack | ................ B60P 7/0823 |
| 2005/0111929 | A1 | * | 5/2005 | Tessier | .................... B60P 7/083 410/100 |
| 2005/0158137 | A1 | * | 7/2005 | Lynch | ................... B60P 7/0876 410/97 |
| 2010/0074709 | A1 | * | 3/2010 | Komarnisky | ......... B60P 7/0823 410/96 |

(Continued)

*Primary Examiner* — Joseph M Rocca
*Assistant Examiner* — Michael R Stabley

(57) ABSTRACT

A hay bale transport device facilitates loading and securement of hay bales for transport. The device includes a trailer configured for being coupled to and moved by a vehicle. The trailer has a front end, a back end, and a pair of lateral sides extending between the front end and the back end. Each of a pair of side harnesses extends along an associated one of the lateral sides of the trailer. Each of the side harnesses includes a pair of end bars and a plurality of wires coupled to and extending between the end bars wherein the side harnesses are configured to secure hay bales on the trailer.

11 Claims, 5 Drawing Sheets

(56) References Cited

U.S. PATENT DOCUMENTS

| | | | |
|---|---|---|---|
| 2012/0093615 A1* | 4/2012 | Priepke | A01D 87/127 414/24.5 |
| 2014/0271093 A1* | 9/2014 | Wirt | B60P 7/08 414/800 |
| 2016/0167563 A1* | 6/2016 | Nelson | B60P 7/12 410/47 |

* cited by examiner

HAY BALE TRANSPORT DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

(2) Description of Related Art Including Information Disclosed Under 37 CFR 1.97 and 1.98

The disclosure and prior art relates to transport devices and more particularly pertains to a new transport device for facilitating loading and securement of hay bales for transport.

(h) BRIEF SUMMARY OF THE INVENTION

An embodiment of the disclosure meets the needs presented above by generally comprising a trailer configured for being coupled to and moved by a vehicle. The trailer has a front end, a back end, and a pair of lateral sides extending between the front end and the back end. Each of a pair of side harnesses extends along an associated one of the lateral sides of the trailer. Each of the side harnesses includes a pair of end bars and a plurality of wires coupled to and extending between the end bars wherein the side harnesses are configured to secure hay bales on the trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
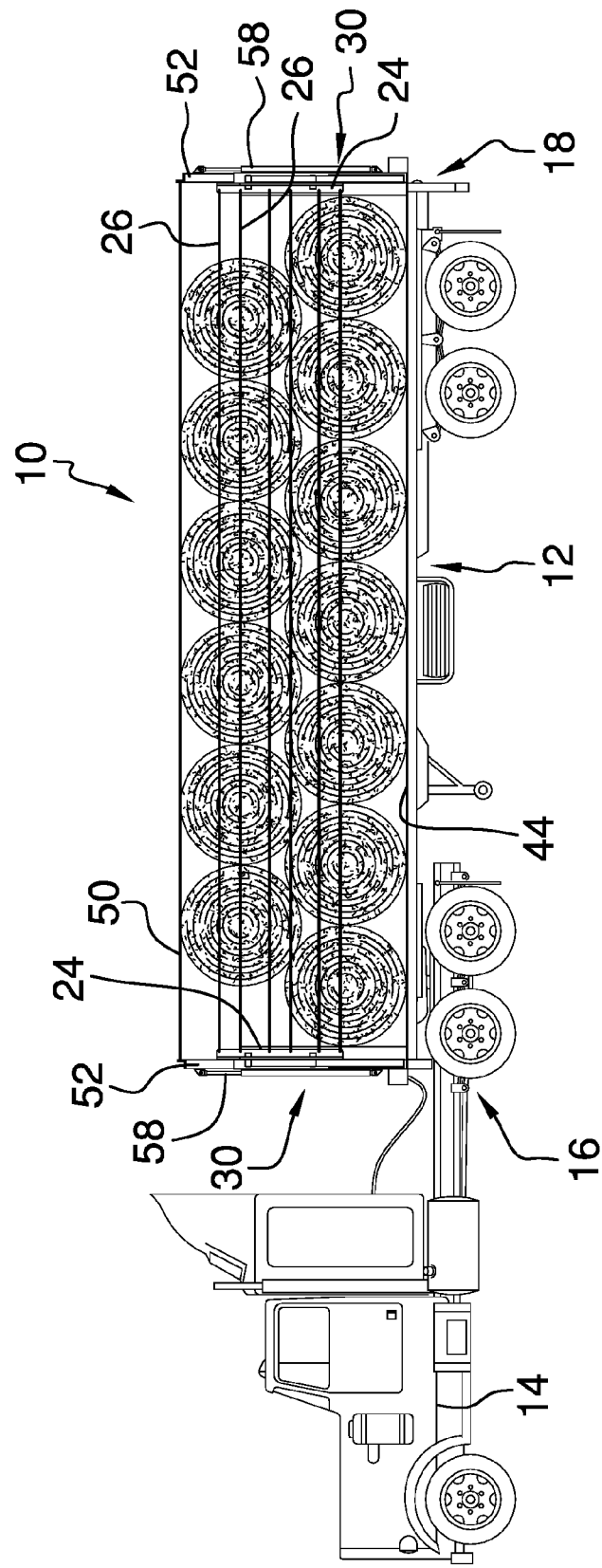
FIG. 1 is a side view of a hay bale transport device according to an embodiment of the disclosure.
Figure 2:
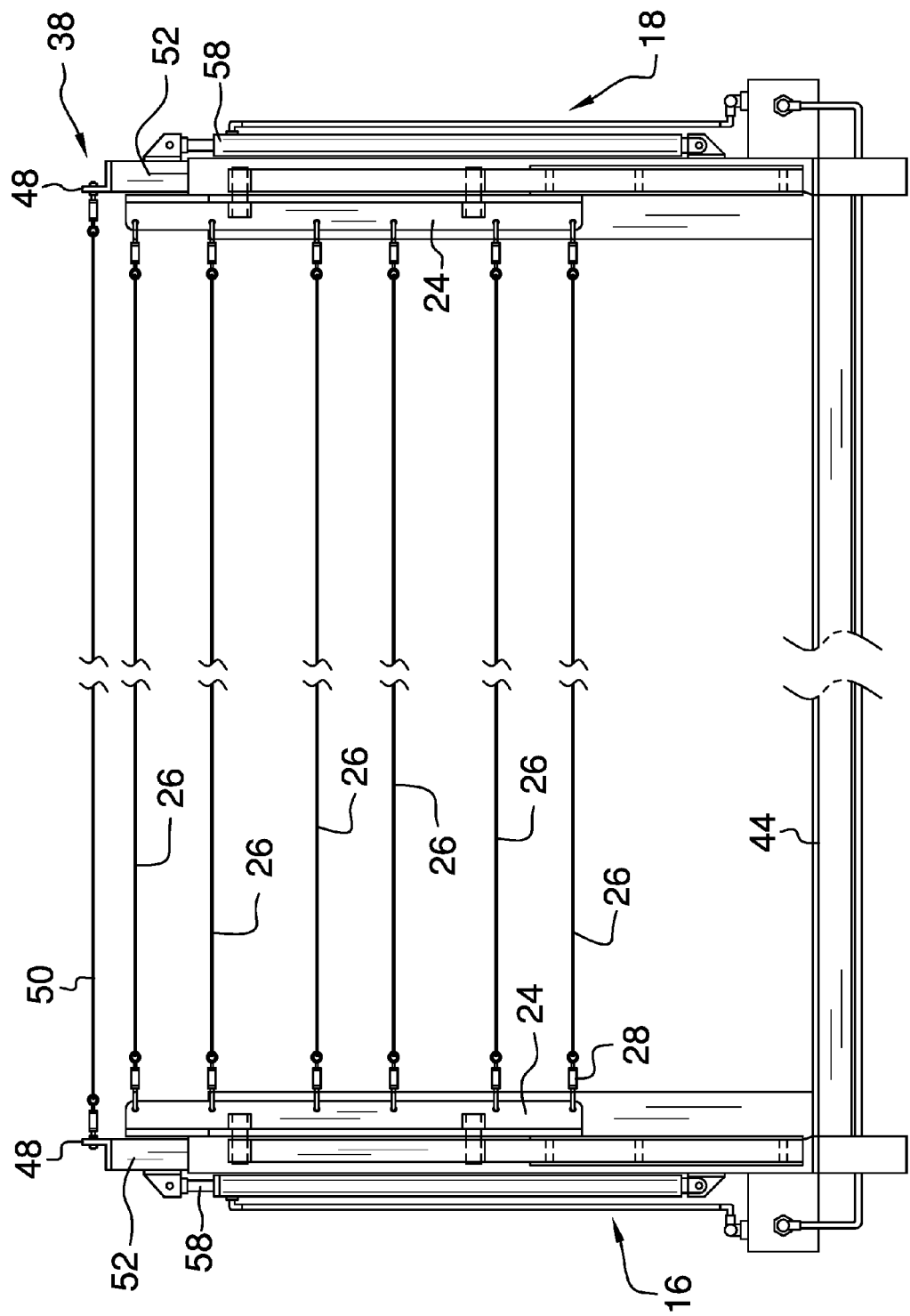
FIG. 2 is a side view of an embodiment of the disclosure.
Figure 3:
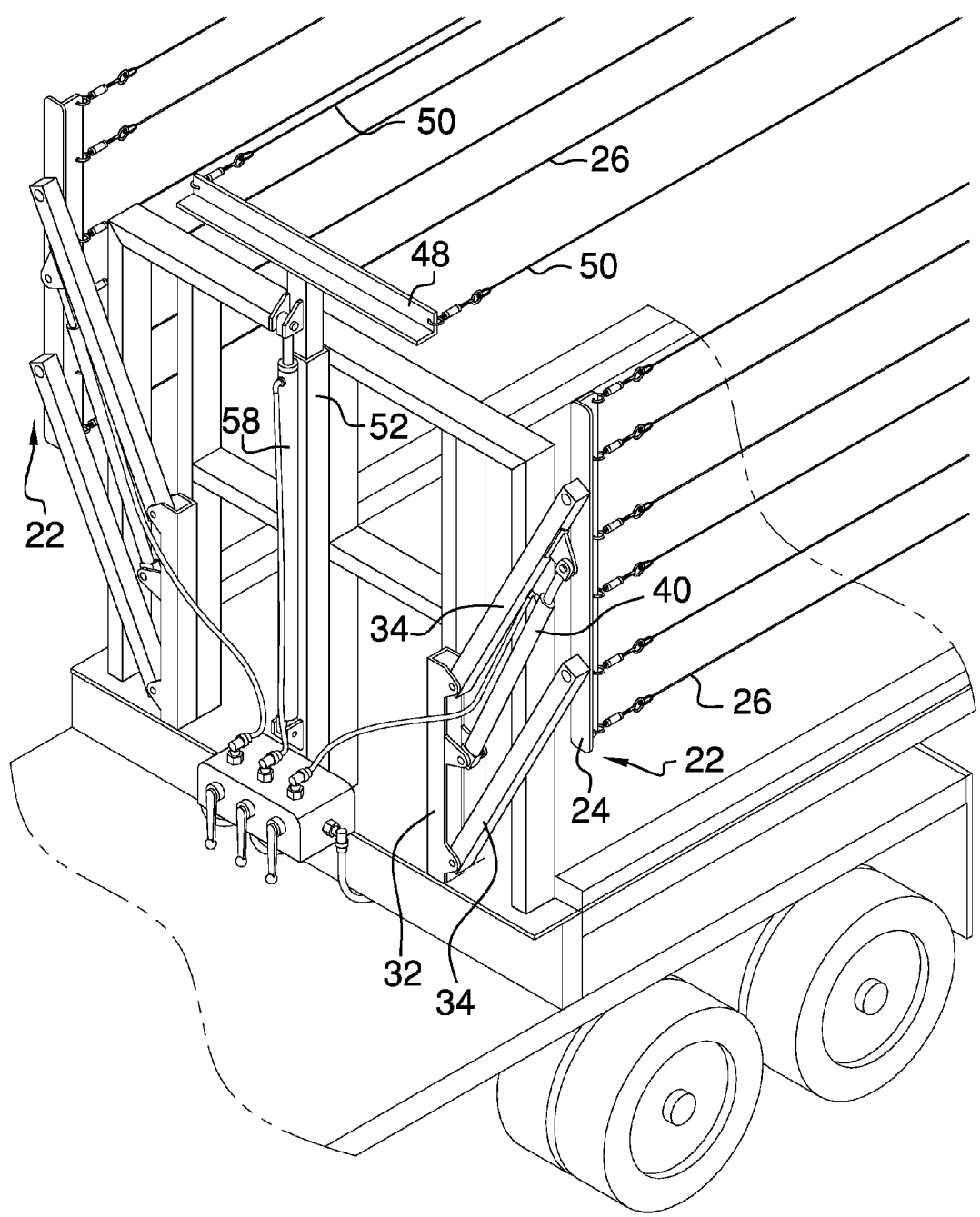
FIG. 3 is a top front side perspective view of an embodiment of the disclosure.
Figure 4:
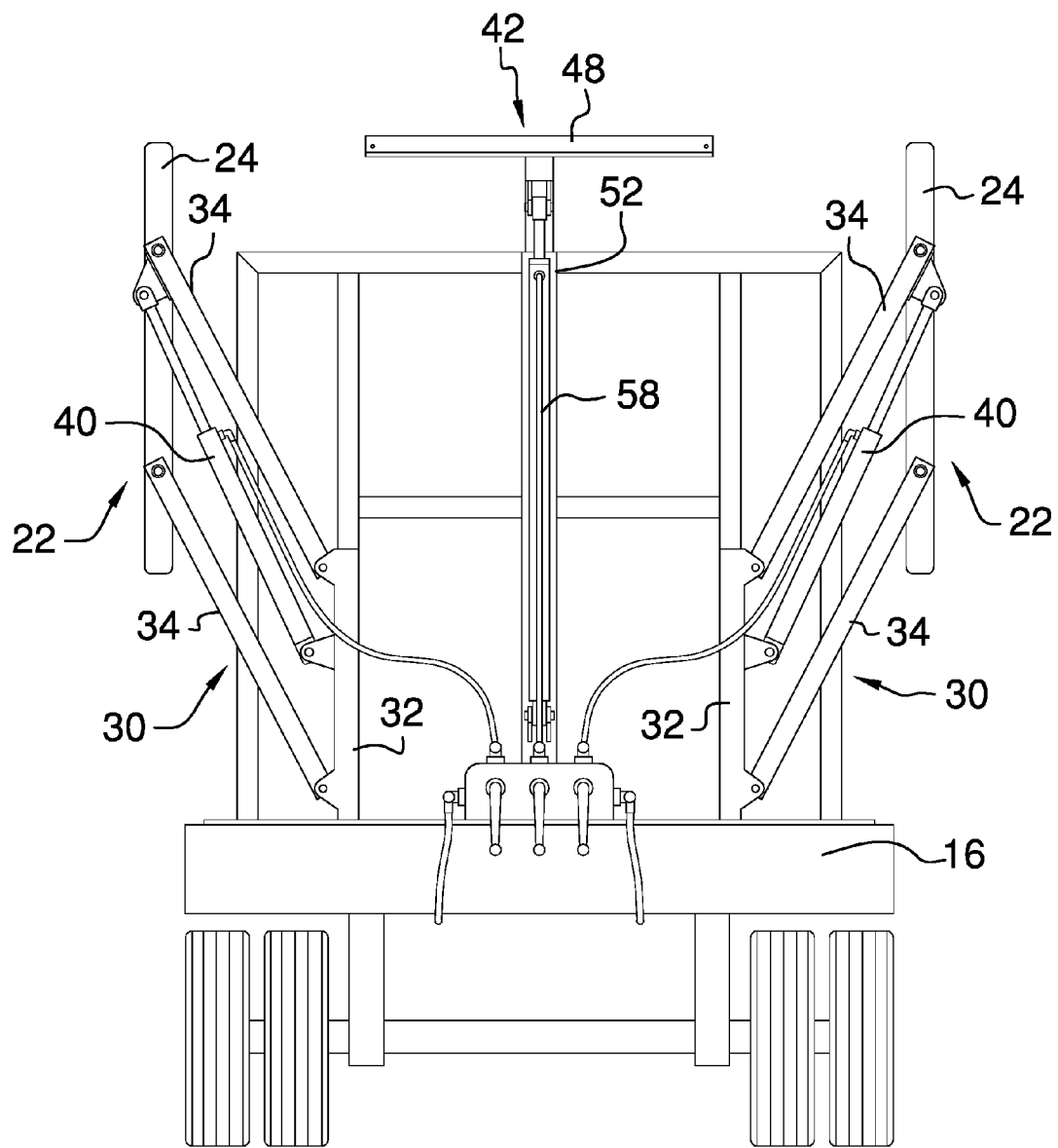
FIG. 4 is a front view of an embodiment of the disclosure in a retracted position.
Figure 5:
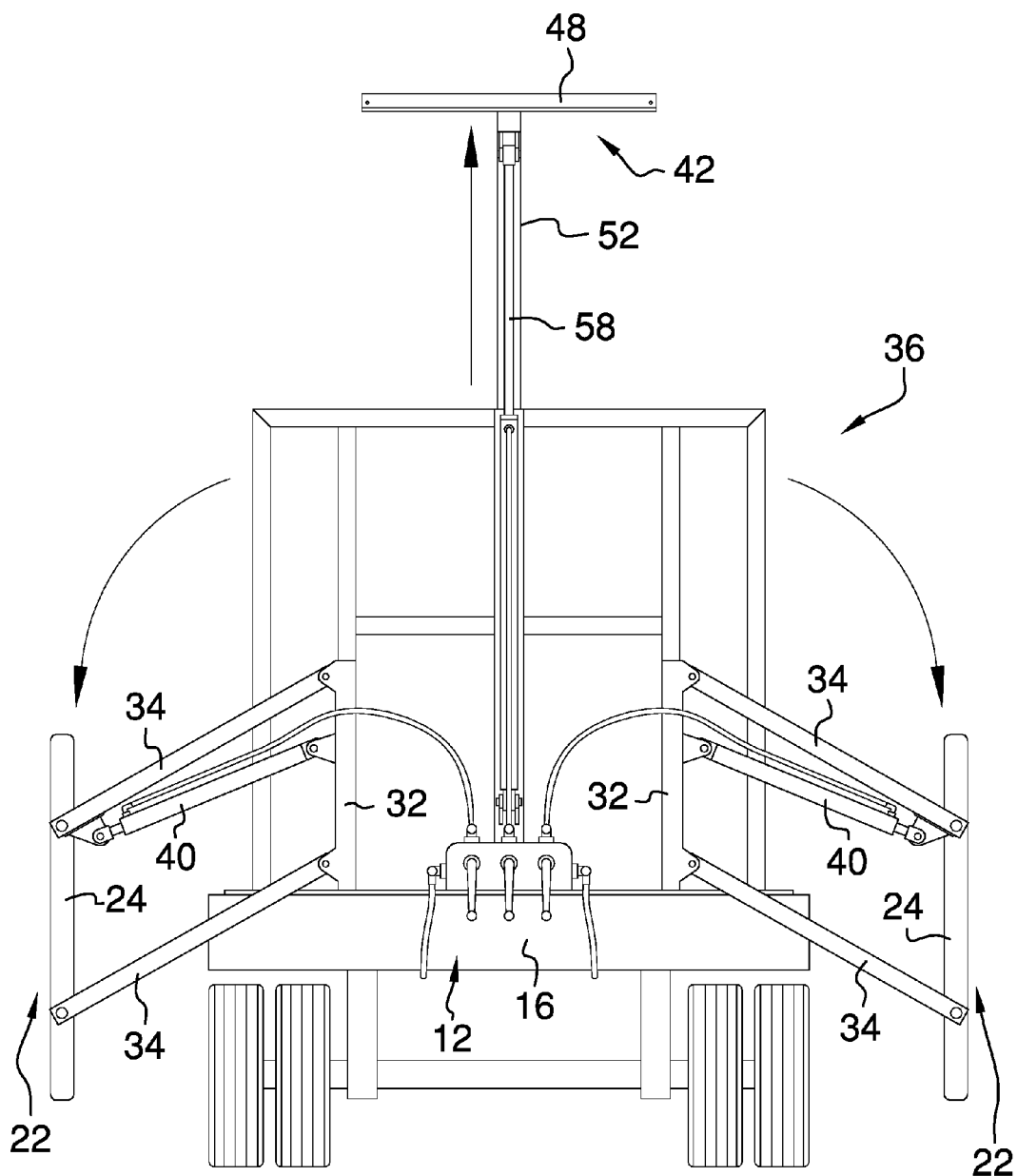
FIG. 5 is a front view of an embodiment of the disclosure in an extended position.

With reference now to the drawings, and in particular to FIGS. 1 through 5 thereof, a new transport device embodying the principles and concepts of an embodiment of the disclosure and generally designated by the reference numeral 10 will be described.

As best illustrated in FIGS. 1 through 5, the hay bale transport device 10 generally comprises a trailer 12 configured for being coupled to and moved by a vehicle 14. The trailer 12 has a front end 16, a back end 18, and a pair of lateral sides 20 extending between the front end 16 and the back end 18. Each of a pair of side harnesses 22 extends along an associated one of the lateral sides 20 of the trailer 12. Each of the side harnesses 22 includes a pair of end bars 24 and a plurality of wires 26 coupled to and extending between the end bars 24. The wires 26 are parallel, horizontal, and held in tension between the end bars 24. Conventional adjusters 28 may be used on each wire 26 to adjust tension as needed. Each of the end bars 24 is vertically oriented and coplanar with the end bar 24 of the same side harness 22. Each of the end bars 24 is coupled to a respective pivoting assembly 30. Each pivoting assembly 30 has a base bracket 32 coupled to the trailer 12 and a pair of pivoting arms 34 coupled to and extending between the base bracket 32 and an associated one of the end bars 24. Thus, the associated one of the end bars 24 is moved between an extended position 36 and a retracted position 38. Each end bar 24 is maintained in a vertical orientation while moving between the extended position 36 and the retracted position 38. Each pivoting assembly 30 includes a ram 40 coupled to and extending between the base bracket 32 and one of the pivoting arms 34 wherein extension and retraction of the ram 40 moves the associated one of the end bars 24. The ram 40 may be hydraulic and tied into a hydraulic system of the vehicle 14. In the extended position 36 the end bars 24 and wires 26 may be positioned below a loading surface 44 of the trailer 12 to provide access to the loading surface 44 and facilitate loading of large round hay bales onto the trailer 12. The side harnesses 22 may be operated independently. Further, one side harness 22 may be fixed such that loading is performed from only one side of the trailer 12. However, the side harnesses 22 may operate together in coordination and be symmetrical about a longitudinal central axis of the trailer 12 such that the side harness 22 center the load on the trailer 12 when moved into the retracted position 38. Operational controls 46 for the side harnesses 22 may be positioned at the front end 16 or rear end 18 of the trailer 12.

A top harness 42 is coupled to the trailer 12. The top harness 42 has a pair of end beams 48 and a plurality of top lines 50 coupled to and extending between the end beams 48. The end beams 48 are horizontally oriented and coplanar with each other. The top harness 42 includes a pair of telescopic posts 52. Each of the end beams 48 is coupled to an associated one of the telescopic posts 52 wherein a height of each of the end beams 48 relative to the loading surface 44 of the trailer 12 is adjustable. Thus, the top lines 50 may be extended away from the loading surface 44 to facilitate loading. The top lines 50 may be in tension between the end beams 48 or provided with some slack such that lowering of the end beams 48 will allow the top lines 50 to curve over hay bales positioned adjacent the front end 16 and back end 18 of the trailer 12. A conventional adjustment method may be incorporated for adjusting tension in the top lines 50. A respective piston 58 may be coupled to each telescopic post 52 such that extension and retraction of the piston 58 raises and lowers the end beam 24 attached to the telescopic post 52. The piston 58 may be hydraulic. Pistons 58 positioned at each of the front end 16 and back end 18 of the trailer 12 may be operated separately or the operation may be coordinated and controlled by a single actuator.

In use, the side harnesses 22 and top harness 42 are extended to provide access to the loading surface 44. Hay bales are loaded onto the loading surface 44. The side harnesses 22 are moved to the retracted position 38 to secure the hay bales on the trailer 12 and prevent the hay bales from moving laterally off of the loading surface 44. The top harness 42 is adjusted to extend over the hay bales and hold the hay bales down such that the hay bales are prevented from upward movement away from the loading surface 44 during transport. For unloading of the hay bales, the top harness 42 and side harnesses 22 are moved to the retracted position 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A hay bale transport device comprising:
   a trailer configured for being coupled to and moved by a vehicle, said trailer having a front end, a back end, and a pair of lateral sides extending between said front end and said back end; and
   a pair of side harnesses, each side harness extending along an associated one of said lateral sides of said trailer, each of said side harnesses including a pair of end bars and a plurality of wires coupled to and extending between said end bars, each of said end bars being coupled to a respective pivoting assembly, each pivoting assembly having a base bracket coupled to said trailer and a pair of pivoting arms coupled to and extending between said base bracket and an associated one of said end bars wherein said associated one of said end bars is moved between an extended position and a retracted position.

2. The device of claim 1, further comprising each of said end bars being vertically oriented and coplanar.

3. The device of claim 1, further comprising each said end bar being maintained in a vertical orientation while moving between said extended position and said retracted position.

4. The device of claim 1, further comprising each said pivoting assembly including a ram coupled to and extending between said base bracket and one of said pivoting arms wherein extension and retraction of said ram moves said associated one of said end bars.

5. The device of claim 4, further comprising said ram being hydraulic.

6. A hay bale transport device comprising:
   a trailer configured for being coupled to and moved by a vehicle, said trailer having a front end, a back end, and a pair of lateral sides extending between said front end and said back end;
   a pair of side harnesses, each side harness extending along an associated one of said lateral sides of said trailer, each of said side harnesses including a pair of end bars and a plurality of wires coupled to and extending between said end bars; and
   a top harness coupled to said trailer, said top harness having a pair of end beams and a plurality of top lines coupled to and extending between said end beams.

7. The device of claim 6, further comprising said top harness including a pair of telescopic posts, each of said end beams being coupled to an associated one of said telescopic posts wherein a height of each of said end beams relative to a loading surface of said trailer is adjustable.

8. The device of claim 7, further comprising a piston coupled to said telescopic post such that extension and retraction of said piston raises and lowers said end beam.

9. The device of claim 8, further comprising said piston being hydraulic.

10. The device of claim 6, further comprising said end beams being horizontally oriented and coplanar.

11. A hay bale transport device comprising:
    a trailer configured for being coupled to and moved by a vehicle, said trailer having a front end, a back end, and a pair of lateral sides extending between said front end and said back end;
    a pair of side harnesses, each side harness extending along an associated one of said lateral sides of said trailer, each of said side harnesses including a pair of end bars and a plurality of wires coupled to and extending between said end bars, each of said end bars being vertically oriented and coplanar, each of said end bars being coupled to a respective pivoting assembly, each pivoting assembly having a base bracket coupled to said trailer and a pair of pivoting arms coupled to and extending between said base bracket and an associated one of said end bars wherein said associated one of said end bars is moved between an extended position and a retracted position, each said end bar being maintained in a vertical orientation while moving between said extended position and said retracted position, each said pivoting assembly including a ram coupled to and extending between said base bracket and one of said pivoting arms wherein extension and retraction of said ram moves said associated one of said end bars, said ram being hydraulic;

a top harness coupled to said trailer, said top harness having a pair of end beams and a plurality of top lines coupled to and extending between said end beams, said end beams being horizontally oriented and coplanar, said top harness including a pair of telescopic posts, each of said end beams being coupled to an associated one of said telescopic posts wherein a height of each of said end beams relative to a loading surface of said trailer is adjustable; and a piston coupled to said telescopic post such that extension and retraction of said piston raises and lowers said end beam, said piston being hydraulic.

* * * * *